United States Patent [19]
Ray et al.

[11] Patent Number: 6,067,529
[45] Date of Patent: May 23, 2000

[54] SYSTEM AND METHOD FOR SENDING A SHORT MESSAGE CONTAINING PURCHASE INFORMATION TO A DESTINATION TERMINAL

[75] Inventors: Dipankar Ray, Garland; Vladimir Alperovich, Dallas, both of Tex.

[73] Assignee: Ericsson Inc., Research Triangle Park, N.C.

[21] Appl. No.: 09/133,024

[22] Filed: Aug. 12, 1998

[51] Int. Cl.[7] .................................................. G06F 17/60
[52] U.S. Cl. ................ 705/26; 705/27; 705/16; 455/466; 380/270; 380/271
[58] Field of Search ................. 705/26, 27, 29, 705/35, 37, 39, 42; 455/466, 403, 517, 405, 406; 380/270, 271

[56] References Cited

U.S. PATENT DOCUMENTS

| | | | |
|---|---|---|---|
| 5,719,918 | 2/1998 | Serbetciouglu et al. | 455/466 |
| 5,739,512 | 4/1998 | Tognazzini | 235/380 |
| 5,768,509 | 6/1998 | Gunluk | 709/203 |
| 5,873,030 | 2/1999 | Mechling et al. | 455/408 |
| 5,915,022 | 6/1999 | Robinson et al. | 380/24 |

*Primary Examiner*—James P. Trammell
*Assistant Examiner*—Yehdega Retta
*Attorney, Agent, or Firm*—Jenkens & Gilchrist, P.C.

[57] ABSTRACT

A telecommunications system and method is disclosed for providing a substantially immediate electronic receipt after a consumer has made a purchase. When a consumer makes a purchase, the sales terminal, which is attached with a short message/e-mail sending capable terminal, can generate and route a short message along with the detailed purchase information to a transport address or alias address associated with the consumer via a Gatekeeper for the Internet for the area that the sales terminal is located in. Upon receipt of the short message, the Gatekeeper can then convert the alias address to the transport address, if the alias address is given and the consumer does not want the short message sent to the alias address, and forward the short message through the Internet to that transport address (or alias address) as an Internet Protocol datagram for storage and retrieval of the short message by the consumer either immediately or at a later time.

28 Claims, 5 Drawing Sheets

SYSTEM AND METHOD FOR SENDING A SHORT MESSAGE CONTAINING PURCHASE INFORMATION TO A DESTINATION TERMINAL

BACKGROUND AND OBJECTS OF THE PRESENT INVENTION

With the recent advent of Internet telephony services, many types of information, including voice, data and short messages can be transferred over existing telephone lines in a cost effective and efficient manner. Internet telephony services utilize the Internet, which is based on the Transmission Control Protocol/Internet Protocol (TCP/IP protocol), which was developed as a standard protocol to allow different types of computers to exchange electronic mail and other files over a network. The TCP/IP Protocol specifies the addressing of nodes on the Internet and a provides a method of sending packets of data from one node to another. The TCP or Transmission Control Protocol is an application implemented on top of the Internet Protocol to provide reliable delivery of the data packets.

With reference now to FIG. 1 of the drawings, in order to place a call to a called party 150 using Internet telephony services, the calling party, while connected to the Internet 120, can dial a special number on a computer 100 or laptop, which includes the called party number 115, in order to route the call to a Gatekeeper 110 for the Internet 120 serving the area 105 that the calling party 100 is located in. This originating Gatekeeper 110 can then convert the called party number 115 into an IP address 125, and route the call through the Internet 120, using the TCP/IP protocol, to another remote Gatekeeper 130 on the other end serving the area 155 that the called party 150 is located in. This remote Gatekeeper can route the call through the Internet 120 back into either the Public Switched Telephone Network (PSTN) 140 or the Public Land Mobile Network (PLMN), the former being illustrated, which can convert the IP address 125 back into the called number 115 associated with the called party 150 and connect the call to the called party 150.

Advantageously, by utilizing the Internet 120 to send voice and data messages, information can be transferred substantially simultaneously in a paper-less environment. In addition, if the calling party 100 is sending a data message to the called party 150, many Internet Service Providers (ISPS) (not shown) provide electronic mail (E-mail) addresses to their customers for storage and retrieval of data messages. However, the vast resources made available by the Internet 120 have not been fully explored by consumers and merchants.

For example, when a consumer makes a purchase with a credit card, the consumer receives the bill for the purchase once every month. However, the bill usually does not contain the itemized distribution of the purchase. Instead, itemized distribution is typically only given in a paper receipt to the consumer after the purchase is made and after the consumer has signed the credit card receipt. In addition, if the transaction is handled by cash or other means of purchase, e.g., by check, a paper receipt including the details of the purchase is typically given to the consumer only at the time of payment.

Thus, if there is any misuse of the consumers credit cards or checks, the consumer usually only has knowledge of the misuses at the end of the month or other billing cycle when the credit card bill or bank statement arrives from the financial institution. Therefore, by the time the credit card bill arrives, it is too late to protect against any fraud or misuse. In addition, when the consumer receives the detailed receipt at the time of purchase, the consumer typically does not have the time to verify the price, quantity, and other purchase information until after the consumer has left the store. Furthermore, if the paper receipt is lost, it can be difficult for the consumer to return the merchandise for a refund or dispute the charges.

It is, therefore, an object of the present invention to provide substantially immediate purchase information to consumers in a paper-less environment.

It is a further object of the present invention to allow a consumer to indicate at the time of purchase whether the consumer desires an electronic receipt.

It is still a further object of the present invention to send an electronic receipt to a consumer's transport address for storage and retrieval by the consumer either immediately upon receipt of the e-mail containing the electronic receipt or at a later time.

It is still a further object of the present invention to send an electronic receipt to a consumer's mobile telephone through a short message system for storage and retrieval by the consumer either immediately upon receipt of the electronic receipt or at a later time.

SUMMARY OF THE INVENTION

The present invention is directed to telecommunications systems and methods for providing a substantially immediate electronic receipt after a consumer has made a purchase by cash, check, credit card, or other type of payment. When a consumer makes a purchase, the sales terminal, which is attached with a short message/e-mail sending capable terminal, can generate and send a short message along with the detailed purchase information towards the consumer's transport address or alias address. The consumer's transport address includes the consumer's Internet Protocol (IP) address and the port address. An alias address can be, for example, the consumer's credit card number, e-mail address or phone number. The transport address or alias address can be provided by the consumer or can be stored on the consumer's credit card or an additional card. The short message generated by the sales terminal is sent to the transport or alias address by routing the message from the sales terminal to a Gatekeeper for the area that the sales terminal is located in. The Gatekeeper can then determine where to route the short message for delivery to the consumer's transport or alias address for storage and retrieval by the consumer either immediately upon receipt of the electronic receipt or at a later time.

Advantageously, embodiments of the present invention reduce credit card forgery due to the substantially immediate receipt of the purchase information. In addition, embodiments enable the consumer to be aware of the current balance on their credit card in order to prevent unlimited use of their credit card. Furthermore, the electronic receipt can be used by the consumer for refund purposes in case the paper receipt has been lost. Finally, the use of electronic billing and receipts can prevent unnecessary paper waste, thus improving the environment.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
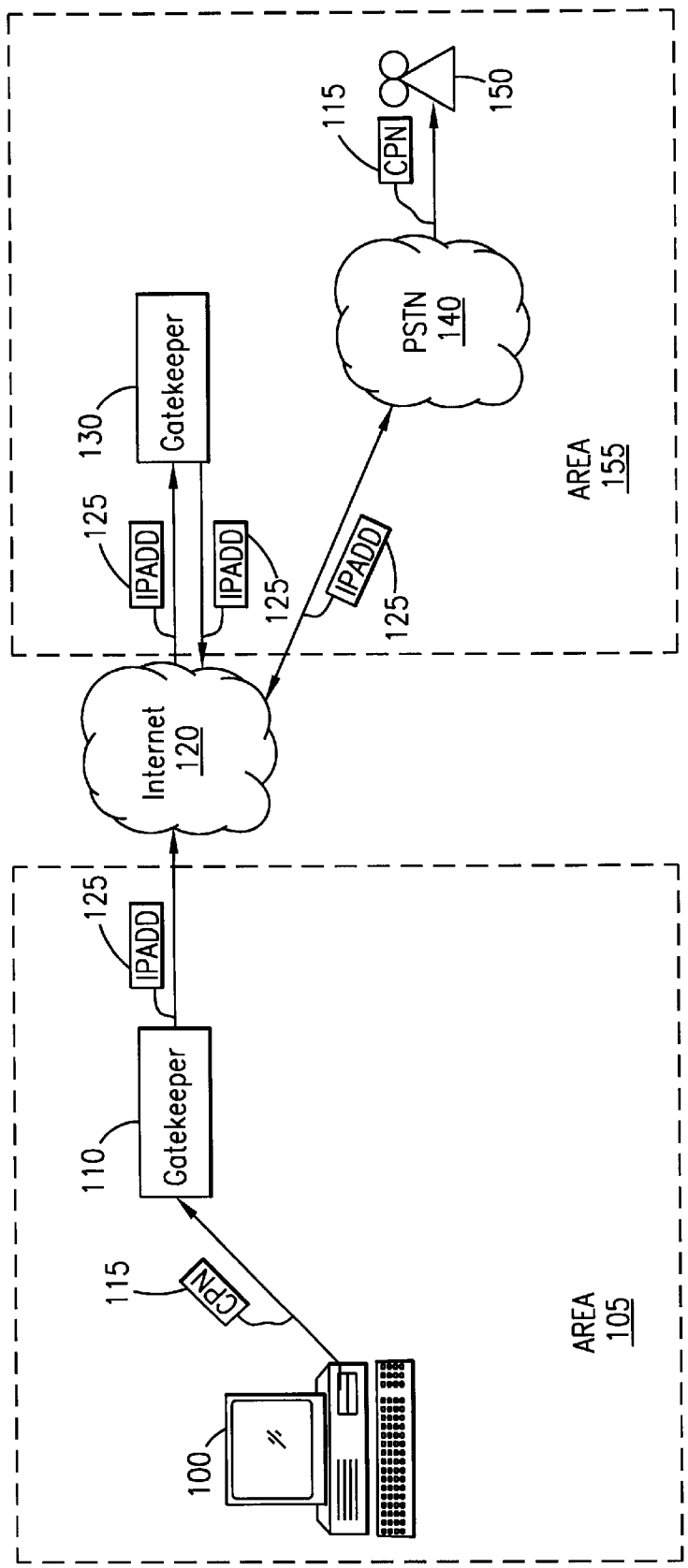
FIG. 1 is a block diagram illustrating the routing of an Internet telephony call through the Internet to a destination terminal.
Figure 2:
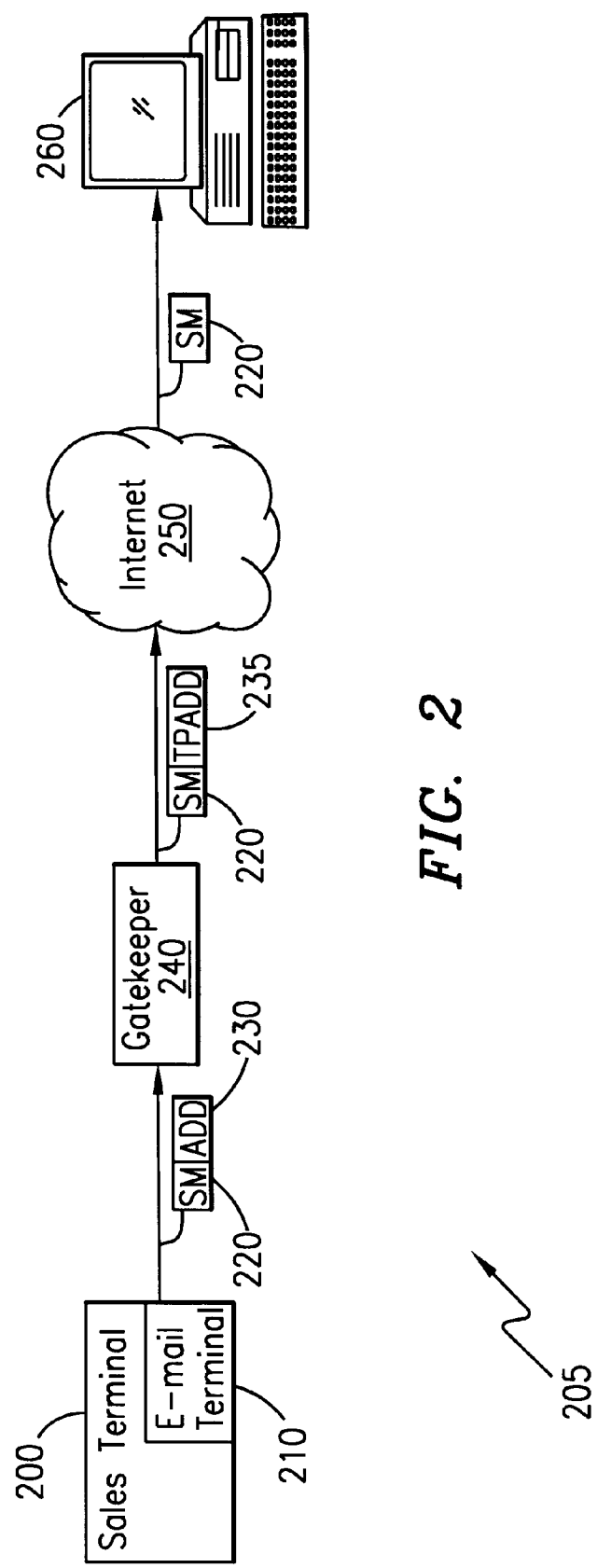
FIG. 2 depicts the routing of a short message containing purchase information via the Internet to a destination terminal within the same area as a Gatekeeper associated with a sales terminal from which the purchase was made.

With reference now to FIG. 2 of the drawings, in order for a consumer to receive an electronic receipt containing detailed purchase information for a purchase made by the consumer, a sales terminal 200 responsible for processing the receipt can be attached to or integrated with a short message/e-mail sending capable terminal 210. For example, an H.323 terminal, which is an Internet Protocol (IP) terminal capable of sending messages over the Internet 250, can have the capability of reading a credit card number by, for example, reading the credit card number off of the magnetic strip on the back of the credit card when the card is swiped through the sales terminal 200. It should be noted that the detailed purchase information can include an itemized distribution, e.g., a list of items purchased and the associated price, and can also preferably carry the signature of the buyer if the signature is performed electronically.

Once the sales terminal 200 has confirmed authorization of the credit card, or once the consumer has paid by cash or check, the consumer can be asked by the salesperson whether the consumer desires an electronic receipt. If the consumer does want an electronic receipt, the consumer must provide a transport address or an alias address 230 associated with a destination terminal 260 to the salesperson. The consumer's transport address 230 can include the consumer's Internet Protocol (IP) address and the port address, whereas an alias address 230 can be, for example, the consumer's credit card number, e-mail address or telephone number.

Figure 4:
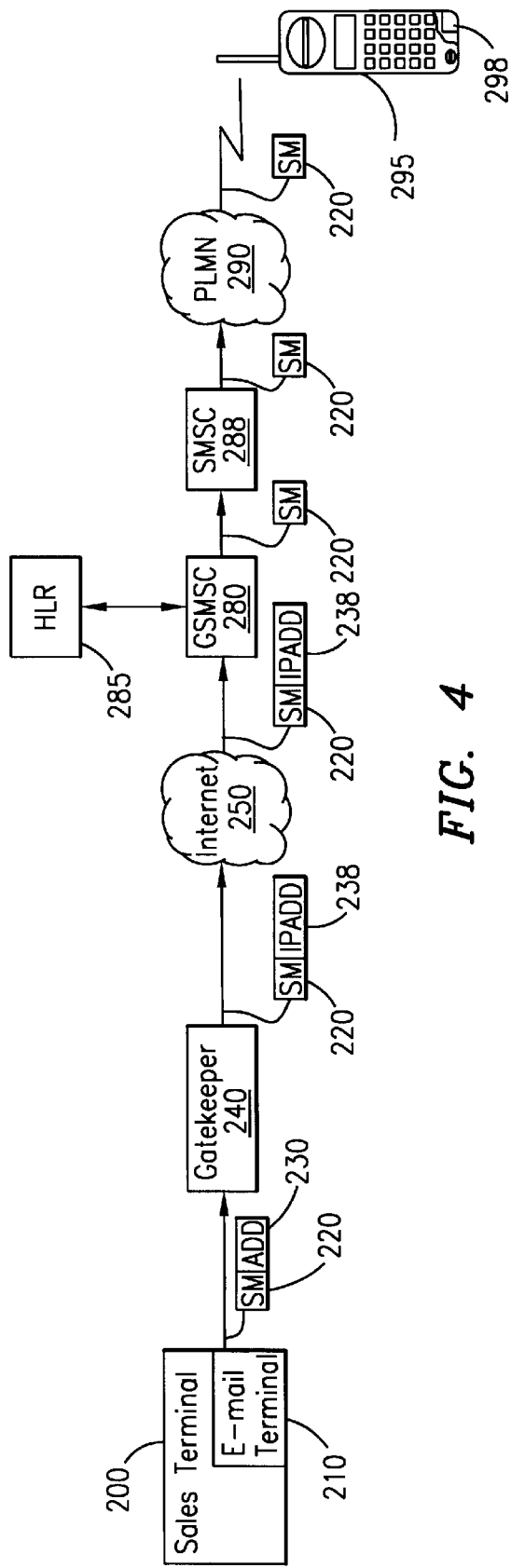
FIG. 4 shows the routing of a short message containing purchase information via the Gatekeeper, the Internet and a Short Message Service Center to a mobile terminal.

In preferred embodiments of the present invention, if a credit card is used for purchase, the transport address or alias address 230 can be included on the magnetic strip of the credit card or provided by the credit card company when authorization is confirmed. Alternatively, the consumer can present a separate card which has the transport address or alias address 230 on it. In a further alternative embodiment, the credit card number and transport or alias address 230 can be stored in a Subscriber Identity Module (SIM) card 298 or other memory within a mobile telephone 295, as illustrated in FIG. 4 of the drawings. The consumer can provide the telephone number associated with the mobile phone 295 to the salesperson, who can then dial the telephone number to request the credit card number and transport or alias address 230 from the SIM card 298. In preferred embodiments, a menu can be displayed on the mobile phone 295 and the consumer can select from the menu the desired credit card number (if more than one is stored in the SIM card 298) and request an electronic receipt. Thereafter, the SIM card 298 can send the credit card number along with the transport address or alias address 230 (if an electronic receipt is requested) back to the sales terminal 200 for authorization of the credit card number and generation of the electronic receipt. It should be noted that the consumer can provide a transport address or alias address 230 directly to the salesperson if the desired transport address or alias address 230 differs from the address 230 sent by the mobile telephone. In addition, the transport address or alias address 230 does not need to be stored within the SIM card 298, but instead can be supplied by the consumer.

Once the salesperson enters the transport address or alias address 230 into the sales terminal 200, the sales terminal 200 can then instruct the short message sending capable terminal 210 to generate a short message 220 containing the detailed purchase information and send this short message 220 towards the consumer's transport address or alias address 230. The short message can be sent towards the consumer's transport or alias address 230 by routing the short message 220 along with the transport or alias address 230 to a Gatekeeper 240 for the Internet 250 for the area 205 that the sales terminal 200 is located in. The Gatekeeper 240 can then determine whether the transport address or alias address 230 associated with the consumer is registered with that Gatekeeper 240. If the alias or transport address 230 is registered with the Gatekeeper 240 for this area 205, the Gatekeeper 240 can then convert the alias address 230 to the transport address 235, if an alias address 230 is given and an associated transport address 235 is stored within the Gatekeeper 240, and forward the short message 220 to the destination terminal 260 associated with that transport address 235 as an IP datagram using, for example, the User Datagram Protocol (UDP)/IP, which is faster than TCP/IP, but less reliable. It should be noted that other protocols can be used to route the short message 220 to the destination terminal 260, instead of the UDP/IP protocol. The short message 220 can then be stored within the consumer's destination terminal 260, e.g., a personal computer or laptop computer, for immediate or later retrieval by the consumer.

Figure 3:
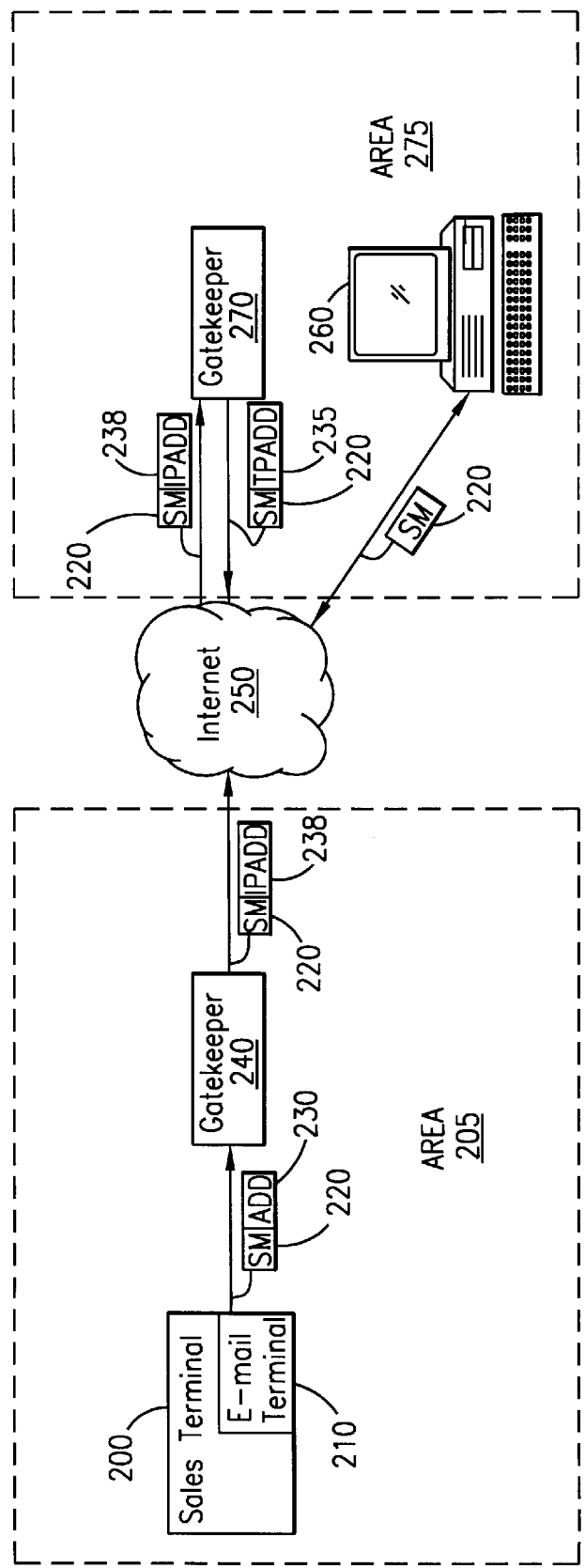
FIG. 3 illustrates the routing of a short message containing purchase information via two Gatekeepers and the Internet to a destination terminal within a different area than the Gatekeeper associated with the sales terminal.

However, with reference now to FIG. 3 of the drawings, if the alias address or transport address 230 is not registered with the originating Gatekeeper 240 for the area 205 serving the sales terminal 200 or if the alias address 230 does not have an associated transport address 235 stored within the originating Gatekeeper 240, then that Gatekeeper 240 can determine the type of alias address 230, if an alias address is given, and the appropriate Gatekeeper 270 for that transport or alias address 230. For example, if the alias address 230 is a telephone number, which does not have an associated transport address 235 registered with the Gatekeeper 240 for the area 205 serving the sales terminal 200, the originating Gatekeeper 240 can determine the correct remote Gatekeeper 270 for the area 275 that the telephone number 230 is associated with, convert the telephone number 230 into an IP address 238, and route the short message 220 containing the detailed receipt along with the IP address 238 through the Internet 250, using the UDP/IP protocol, to the correct remote Gatekeeper 270. Thereafter, the remote Gatekeeper 270 can determine the actual transport address 235 associated with the alias address 230 and forward the short message 220 through the Internet 250 to the destination terminal 260 using that transport address 235.

If the alias address 230 is a telephone number, which does not have an associated transport address 235 registered with either the originating Gatekeeper 240 or the remote Gatekeeper 270, as indicated by FIG. 4 of the drawings, the originating Gatekeeper 240 or remote Gatekeeper 270 (if the telephone number is registered with the remote Gatekeeper 270) must determine the correct Gateway 280 for the telephone number 230 in order to route the short message 220 to the correct destination terminal, which can be either a mobile telephone 295 or a voice mail box (not shown) associated with a wireline phone (not shown).

If, for example, the destination terminal is a mobile terminal 295, then the Gatekeeper 240 can convert the telephone number 230 into an IP address 238 and route the short message 220 through the Internet 250 as IP packets using the IP address 238 to a Gateway Short Message Service Center (GSMSC) 280, which can then convert the short message 220 from IP packets to short message format and obtain routing information for the mobile terminal 295 based upon the current location of the mobile terminal 295 by querying a Home Location Register (HLR) 285 containing the subscriber data for that mobile terminal 295. Thereafter, the GSMSC 280 can route the short message 220 to a Short Message Service Center (SMSC) 288 associated with the current location of the mobile terminal 295. The SMSC 288 can then deliver the short message 220 to the mobile terminal 295 via the Public Land Mobile Network (PLMN) 290 for storage in a memory, e.g., a SIM card 298, within the mobile terminal 295. It should be understood that the mobile terminal 295 can be within any type of cellular network 290, including, but not limited to the Global System for Mobile Communications (GSM) network, the Personal Communications System (PCS) 1900 network, the AMPS network and the D-AMPS network.

Thereafter, the mobile subscriber (consumer) can retrieve the short message 220 either immediately upon receipt of the message 220 or at a later time convenient for the mobile subscriber. The mobile subscriber (consumer) can then optionally download this short message 220 from the mobile terminal 295 to the consumer's IP terminal 260 using existing techniques. Thus, the consumer can have the ability to store short messages 220 long-term on the IP terminal 260, while retaining the most recent short messages 220 on the mobile terminal 295. Therefore, the consumer can have immediate access to the recent short messages 220 without utilizing the limited memory 298 within the mobile terminal 295 for storage of old short messages 220. In addition, by downloading the short messages 220 to an IP terminal 260, the consumer can print out hard copies of the short message 220 containing detailed purchase information, which can be beneficial when attempting to obtain a refund.

However, if the destination terminal is a voice mail box (not shown) associated with a wireline telephone number, the originating 240 or remote Gatekeeper 270 can route the short message 220 to a Public Switched Telephone Network (PSTN) Gateway (not shown), which can then convert the IP packets containing the short message 220 into a speech format and route the synthesized speech message to the voice mail system (not shown) containing the voice mail box associated with the wireline telephone number. The voice mail system can then store the synthesized speech message in the consumer's voice mail box for later retrieval by the consumer. Alternatively, the telephone number associated with the voice mail box can be provided as the alias address 230 instead of the wireline telephone number of the consumer. It should be noted that the short message 20 can also be routed to a voice mail box associated with a wireless telephone number. However, this is less desirable as the consumer cannot download this short message 220 into an IP terminal 260 for conversion of the short message 220 into a readable format. Thus, the short message 220 is not easily accessible for refund purposes.

Figure 5:
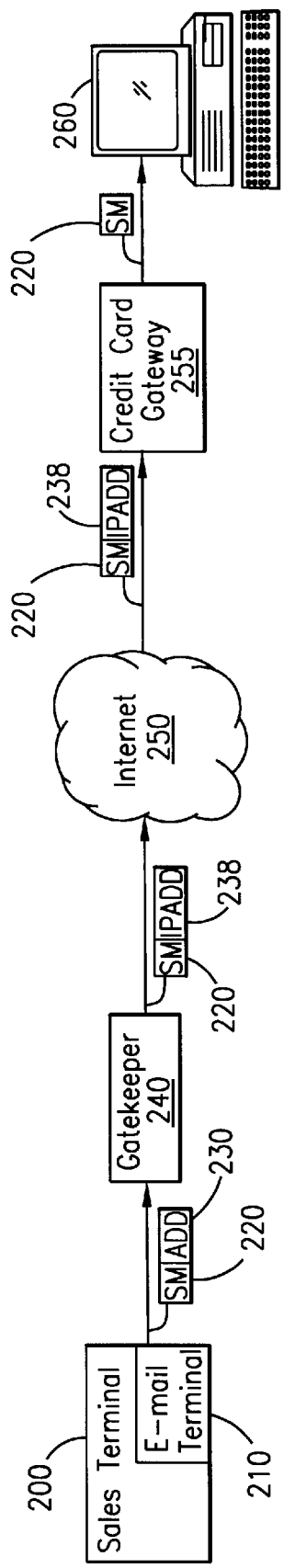
FIG. 5 shows the routing of a short message containing purchase information via the Gatekeeper and the Internet to a destination terminal when the alias address given by the consumer is a credit card number.

With reference now to FIG. 5 of the drawings, if the alias address 230 is a credit card number, the original Gatekeeper 240 must then determine the correct Gateway 255 for the credit card number. This credit card Gateway 255 can contain either the consumer's transport address 235, the address for the remote Gatekeeper 270 associated with the transport address 235, or the PSTN/PLMN Gateway 280 address if the short message 220 is to be routed to the consumer's mobile phone 295 or voice mail box. Once the originating 240 or remote Gatekeeper 270, the former being shown, determines the correct credit card Gateway 255, the short message 220 can be forwarded to the credit card Gateway 255 through the Internet 250 for delivery of the short message 220 to the destination terminal 260 or mobile phone 295 using the transport address 235 or telephone number 230, as discussed above.

Advantageously, embodiments of the present invention reduce credit card forgery due to the substantially immediate receipt of purchase information. In addition, embodiments enable the consumer to be aware of the current balance on their credit card in order to prevent unlimited use of their credit card. Furthermore, the electronic receipt can be used by the consumer for refund purposes in case the paper receipt has been lost. For example, the consumer can take a copy of the electronic receipt to the store, which can keep a record of all its transactions in a database and validate the receipt. Finally, the use of electronic billing and receipts can prevent unnecessary paper waste, thus improving the environment.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing a short message containing purchase information to a destination terminal, comprising:

a sales terminal having a short message terminal connected therewith, said sales terminal generating said short message containing said purchase information and instructing said short message terminal to send said short message to an address associated with said destination terminal via the Internet; and a mobile terminal in wireless communication with a mobile network, said mobile terminal having a memory therein for storing said address, said sales terminal establishing a call connection with said mobile terminal via said mobile network to retrieve said address.

2. The telecommunications system of claim 1, wherein said address further comprises a transport address associated with said destination terminal.

3. The telecommunications system of claim 1, wherein said short message is routed to said destination terminal through the Internet using User Datagram Protocol/Internet Protocol.

4. The telecommunications system of claim 1, wherein said address is an alias address.

5. The telecommunications system of claim 5, further comprising a gatekeeper connected to the Internet, said gatekeeper determining a transport address associated with said alias address and routing said short message to said destination terminal using said transport address.

6. The telecommunications system of claim 6, wherein said transport address is an Internet Protocol (IP) address, said gatekeeper routing said short message to a gateway node associated with said destination terminal using said IP address, said gateway node sending said short message to said destination terminal.

7. The telecommunications system of claim 6, wherein said gateway node is a Gateway Short Message Service Center (GSMSC), said destination terminal being said mobile terminal.

8. The telecommunications system of claim 7, wherein said GSMSC obtains routing information associated with a Short Message Service Center (SMSC) serving said mobile terminal from a Home Location Register, said GSMSC routing said short message to said SMSC, said SMSC sending said short message to said mobile terminal.

9. The telecommunications system of claim 7, wherein said short message is stored in said memory within said mobile terminal.

10. The telecommunications system of claim 9, wherein said memory is a Subscriber Identity Module (SIM) card.

11. The telecommunications system of claim 7, wherein said gatekeeper converts said short message into Internet Protocol (IP) packets, said IP packets being sent to said GSMSC through the Internet, said GSMSC converting said IP packets back into said short message.

12. The telecommunications system of claim 6, wherein said gateway node is a credit card gateway, said alias address being a credit card number, said credit card gateway determining routing information for sending said short message to said destination terminal.

13. A method for providing a short message containing purchase information to a destination terminal, said method comprising the steps of:

storing an address for said destination terminal within a memory in a mobile terminal in wireless communication with the Internet;

establishing a call connection between a sales terminal and said mobile terminal via the Internet;

transmitting said address from said mobile terminal to said sales terminal during said call connection;

generating said short message by said sales terminal having a short message terminal connected therewith;

instructing, by said sales terminal, said short message terminal to send said short message to said address associated with said destination terminal; and routing, by said short message terminal, said short message to said destination terminal through the Internet using said address.

14. The method of claim 13, wherein said address is a transport address associated with said destination terminal.

15. The method of claim 13, wherein said step of routing uses User Datagram Protocol/Internet Protocol.

16. The method of claim 13, wherein said address is an alias address and wherein said step of routing further comprises the step of:

routing, by said short message terminal, said alias address to a gatekeeper connected to the Internet.

17. The method of claim 16, wherein said step of routing further comprises the step of:

determining a transport address associated with said alias address by said gatekeeper.

18. The method of claim 17, wherein said of determining said routing information is performed by said gatekeeper transport address is an Internet Protocol (IP) address, said step of routing said short message to said destination terminal further comprising the steps of:

routing, by said gatekeeper, said short message to a gateway node associated with said destination terminal using said IP address; and sending, by said gateway node, said short message to said destination terminal.

19. The method of claim 18, wherein said gateway node is a Gateway Short Message Service Center (GSMSC), said destination terminal being said mobile terminal.

20. The method of claim 19, wherein said step of sending said short message by said GSMSC to said destination terminal comprises the steps of:

obtaining, by said GSMSC, routing information associated with a Short Message Service Center (SMSC) serving said mobile terminal from a Home Location Register;

routing, by said GSMSC, said short message to said SMSC; and sending, by said GSMSC, said short message to said mobile terminal.

21. The method of claim 19, wherein said short message is stored in said memory within said mobile terminal.

22. The method of claim 21, wherein said memory is a Subscriber Identity Module (SIM) card.

23. The method of claim 19, wherein said step of routing said short message by said gatekeeper to said GSMSC further comprises the steps of:

converting, by said gatekeeper, said short message into Internet Protocol (IP) packets;

sending said IP packets to said GMSC through the Internet; and converting, by said GSMSC, said IP packets back into said short message.

24. The method of claim 18, wherein said gateway node is a credit card gateway, said alias address being a credit card number, said step of sending said short message by said gateway node to said destination terminal being performed by said credit card gateway determining routing information for sending said short message to said destination terminal.

25. The telecommunications system of claim 12, wherein said sales terminal uses said credit card number to authorize said purchase.

26. The telecommunications system of claim 1, wherein said memory further stores at least one credit card number, said sales terminal receiving a select one of said at least one credit card number during said call connection, said select credit card number being used to authorize said purchase.

27. The method of claim 24, further comprising the step of:

authorizing said purchase by said sales terminal using said credit card number.

28. The method of claim 13, further comprising the steps of:

storing at least one credit card number within said memory;

transmitting a select one of said at least one credit card number from said mobile terminal to said sales terminal during said call connection; and authorizing said purchase by said sales terminal using said select credit card number.

* * * * *

UNITED STATES PATENT AND TRADEMARK OFFICE
CERTIFICATE OF CORRECTION

PATENT NO.    : 6,067,529
DATED         : May 23, 2000
INVENTOR(S)   : Dipankar Ray et al.

It is certified that error appears in the above-identified patent and that said Letters Patent is hereby corrected as shown below:

Column 1,
Line 5, before " BACKGROUND AND OBJECTS OF THE PRESENT INVENTION" insert -- Field of the Invention The present invention relates generally to telecommunications systems and methods for routing messages to a destination terminal through the Internet, and specifically to sending an electronic receipt through the Internet to a consumer's destination terminal after a purchase transaction. --
Line 44, replace "(ISPS)" with -- (ISPs) --

Column 7,
Lines 55-56, delete "of determining said routing information is performed by said gatekeeper"

Signed and Sealed this

Second Day of July, 2002

Attest:

Attesting Officer

JAMES E. ROGAN
Director of the United States Patent and Trademark Office